UNITED STATES PATENT OFFICE 2,532,350

PRODUCTION OF INSOLUBILIZED PROTEIN ARTIFICIAL FILAMENTARY PRODUCTS

Robin Hamilton Kendall Thomson, Kilwinning, and Walter Anderson Caldwell, West Kilbride, Scotland, assignors to Imperial Chemical Industries Limited, a corporation of Great Britain No Drawing. Application July 2, 1946, Serial No. 681,152. In Great Britain July 30, 1945

6 Claims. (Cl. 8—127.6)

The present invention relates to a new or improved method for insolubilising artificial filamentary products spun from protein solutions, and more particularly filaments and fibres obtained by the spinning of solutions of vegetable seed globulins especially peanut proteins, or casein, in aqueous alkaline or other suitable media into acidified saline coagulating solutions.

The filamentary products emerging from the coagulating solution are still easily soluble in dilute saline solutions. They can be rendered insoluble in dilute saline solutions and in cold water by a "hardening" treatment with formaldehyde solution, but in order to render the coagulated filamentary products capable of textile applications they must be rendered capable of withstanding also the action of boiling water, so that they can be dried off without sticking together, and also the action of hot dilute acid solutions such as are used in the application of acid wool dyes. Their insolubilisation for these purposes may be effected by means of formaldehyde in strongly saline solutions of high acidity, and especially by treating the coagulated filamentary products, according to a process as described and claimed in U. S. Patent No. 2,347,677. For this purpose there may most advantageously be employed an acidified brine formaldehyde solution containing not less than about 30 parts of sodium chloride per 100 parts of water by weight and sufficient hydrochloric acid or sulphuric acid to bring the pH below 1, the coagulating solution which ordinarily contains sodium sulphate and sulphuric acid being desirably rinsed away from the coagulated filamentary products by immersing the latter in strong brine before introducing it into the insolubilising solution.

The insolubilisation treatment takes place relatively slowly and therefore cannot be conducted while the filament is continuously advancing from the coagulating solution. After the first collection of the newly coagulated filamentary material from the spinneret, which is carried out at a linear rate exceeding the rate of extrusion, it is a frequent practice to subject it to stretching as it is advanced. The resulting coagulated still easily soluble material is highly contractile along its length at this stage, but if they are prevented from contracting in length during their subsequent insolubilisation they yield insolubilised products having good physical properties and a desirable handle. The maintenance of the coagulated filamentary material under tension during its insolubilisation is seldom convenient, and various preliminary treatments adapted to prevent the freshly coagulated unhardened filamentary products, whether or not stretched, from contracting excessively before or during their insolubilisation have been devised. If the coagulated unhardened filamentary products are allowed to contract, the insolubilised material usually exhibits a relatively poor handle, lustre and elongation at break. The stretching or the treatment given to prevent excessive lengthwise contraction of the continuously advancing filamentary product previous to its insolubilisation may necessitate the provision of apparatus on which it can be spaced so that any one element of the advancing filamentary material is maintained under tension for an appreciable period of time, which may be expensive to provide. For instance in U. S. Patent No. 2,358,427 there is described a treatment in which the coagulated filaments are maintained under tension at a fixed length in a saturated sodium chloride solution for several minutes in order to reduce their longitudinal contractility.

In the case of filamentary products derived from certain vegetable seed globulins, such as peanut globulins, the colour of the insolubilised filament obtained by the use of the acidified saline formaldehyde insolubilising solution is also frequently less nearly white than is desirable.

According to the present invention the coagulated unhardened filamentary materials are subjected to the action of a solution of formaldehyde in substantially saturated sodium chloride brine at a pH between 4 and 6 as determined at ordinary temperature, this treatment being carried out at a temperature insufficient to soften the filamentary products, and the so-treated filamentary products are subsequently insolubilised in an acidified brine formaldehyde solution containing not less than about 30 parts of sodium chloride per 100 parts of water by weight and sufficient hydrochloric acid or sulphuric acid to bring the pH below 1.

It is an advantage of the present invention that it is unnecessary to maintain the coagulated filaments under tension during their treatment with the formaldehyde brine solution at pH 4 to 6 since usually little or no contraction takes place during this treatment. It is also unnecessary to maintain the coagulated filaments under tension during their treatment with the formaldehyde brine solution acidified to a pH below 1. Even if contraction should take place in either of the two baths products of good handle, lustre and physical properties are nevertheless still obtained. Moreover, the filamentary products from peanut protein for instance are more nearly white than when insolubilisation is caried out in known manner.

In putting the invention into effect, the coagulating solution employed, which is advantageously an acidified sodium sulphate solution, may if desired be rinsed from the filamentary products by means of a saturated brine solution, and the product may then be brought into contact with a large excess of the formaldehyde brine solution of pH 4 to 6, with which it is allowed to remain in contact for a period which may vary from several minutes at temperatures approaching 40° C. to a few hours at room temperature.

The concentration of formaldehyde required in the brine formaldehyde solution of pH 4 to 6 is not very high, for instance from 1 to 3 per cent. Commercial formaldehyde solutions are acid in reaction, and it may be that the acidity of the amount of formaldehyde solution that is employed in the making up of the brine formaldehyde mixture is sufficient to bring the pH within desired limits. On the other hand, it may be too little or too much, in which case the acidity is adjusted by introduction of an acid or an alkali.

The subsequent treatment with the solution containing formaldehyde, sodium chloride and hydrochloric acid or sulphuric acid having a pH below 1 as measured at room temperature may conveniently be carried out at warm temperatures, for instance 35 to 50° C.

The invention is further illustrated by the following example:

*Example*

A viscous aged solution of peanut globulin containing approximately 24 per cent of the protein in a solvent consisting of 1.35 per cent sodium hydroxide solution, having a viscosity of approximately 80 poises at 20° C., is extruded through a multiple holed spinneret into a coagulating bath consisting of a solution containing 2 per cent sulphuric acid, 20 per cent sodium sulphate and 78 per cent water at 30° C., the rotational speed of the collecting roller being such that the filaments are collected at several times the linear rate at which the viscous solution passes through the orifices of spinneret. The resulting bundles of filaments are cut automatically into fibre in a stream of saturated sodium chloride solution and the staple fibre is immersed in a relatively large volume of a solution made by dissolving in strong sodium chloride brine sufficient commercial formaldehyde solution to give a formaldehyde concentration of 1½ per cent, adding sufficient solid sodium chloride to saturate the solution, and adjusting the pH to 5.0 by the addition of hydrochloride acid or sodium hydroxide, whichever may be required. The temperature of the solution is 20° C., and the staple fibre remains immersed in the solution for two hours. It is then removed, drained and immersed in an insolubilisation bath made up from strongly acidified formaldehyde brine made up from sodium chloride solution with excess solid sodium chloride containing 1½ per cent formaldehyde and 2½ per cent sulphuric acid which has a pH below 1. The temperature of the insolubilisation bath is 38° C., and the staple fibre remains in it for 18 hours. The resulting fibres are washed in water and centrifuged. They are then soaked in a dilute suspension of sodium cetyl sulphate and their residual acidity is removed by the action of 25 times their weight of 0.5 per cent sodium carbonate solution at room temperature for about 20 minutes. They are then again washed, centrifuged and dried at about 40° C. in a current of air.

As a result of this treatment the fibres are satisfactorily resistant to the action of a treatment for 90 minutes at 90° C. with an aqueous bath containing 0.1 per cent sulphuric acid and 0.25 per cent sodium sulphate in solution.

The fibre is pale in colour and of good lustre and handle and drafts well. Its diameter is 23 microns and its elongation at break about 77 per cent.

When staple fibres similarly spun from the same peanut globulin solution into the same coagulating bath and similarly cut are insolubilised in similar fashion in a similar bath containing 1½ per cent formaldehyde and 2½ per cent sulphuric acid in saturated brine having a pH below 1 without the preliminary treatment in the formaldehyde brine bath at pH 5, and is similarly after treated, it is found to have a darker colour, a duller lustre and to be of less satisfactory handle and drafting properties. Its diameter is slightly greater and its elongation at break considerably less than that of the sample treated in accordance with the present invention.

We claim:

1. A method for insolubilizing artificial filamentary products obtained by the spinning of aqueous alkaline solutions of vegetable seed globulins into acidified saline coagulating solutions which comprises treating the filamentary products having a solubility substantially the same as that immediately after coagulation at a temperature between 20° to 40° C. while in an untensioned condition in an aqueous bath comprising about 1 to 3 per cent formaldehyde and saturated with sodium chloride having a pH between 4 to 6, and immediately thereafter, treating the resulting products in untensioned condition at a temperature between 35° and 50° C. in an aqueous insolubilizing solution comprising formaldehyde and at least 30 parts of sodium chloride per 100 parts of water by weight having a pH below 1.

2. A method as claimed in claim 1, wherein said filamentary products are staple fibers of peanut protein.

3. A method as claimed in claim 1, wherein the pH below 1 is said insolubilizing solution is obtained by addition to the solution of an acid from the group consisting of sulphuric and hydrochloric acids.

4. A method as claimed in claim 1 wherein the coagulated unhardened filamentary materials are rinsed free of coagulating solution by means of a saturated brine solution prior to subjecting them to the action of the solution of formaldehyde in substantially saturated sodium chloride brine at a pH between 4 and 6.

5. A method as claimed in claim 1 wherein the coagulated unhardened filamentary materials are allowed to remain in contact with said formaldehyde brine solution of pH 4 to 6 for a period of several minutes at about 40° C.

6. A method as claimed in claim 1 wherein the coagulated unhardened filamentary materials are allowed to remain in contact with said formaldehyde brine solution of pH 4 to 6 for a period of a few hours at room temperature.

ROBIN HAMILTON KENDALL THOMSON.
WALTER ANDERSON CALDWELL.

REFERENCES CITED

The following references are of record in the file of this patent:

UNITED STATES PATENTS

| Number | Name | Date |
|---|---|---|
| 2,266,672 | Wormell | Dec. 16, 1941 |
| 2,347,677 | Fieldsend et al. | May 2, 1944 |
| 2,372,622 | Wormell | Mar. 27, 1945 |
| 2,385,674 | Wormell | Sept. 25, 1945 |

FOREIGN PATENTS

| Number | Country | Date |
|---|---|---|
| 107,262 | Australia | May 4, 1939 |